(12) United States Patent
Pellerin

(10) Patent No.: US 12,480,596 B2
(45) Date of Patent: Nov. 25, 2025

(54) MULTI-FUNCTION FLUID CONTROL VALVE

(71) Applicant: Pratt & Whitney Canada Corp., Longueuil (CA)

(72) Inventor: Hugues Pellerin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 10 days.

(21) Appl. No.: 18/416,521

(22) Filed: Jan. 18, 2024

(65) Prior Publication Data
US 2025/0237320 A1    Jul. 24, 2025

(51) Int. Cl.
| | |
|---|---|
| F16K 31/122 | (2006.01) |
| F01D 17/14 | (2006.01) |
| F02C 7/232 | (2006.01) |
| F16K 3/26 | (2006.01) |
| F16K 17/06 | (2006.01) |
| F16K 27/08 | (2006.01) |
| F16K 41/14 | (2006.01) |

(52) U.S. Cl.
CPC .......... *F16K 31/1225* (2013.01); *F16K 3/265* (2013.01); *F16K 17/065* (2013.01); *F01D 17/141* (2013.01); *F02C 7/232* (2013.01); *F16K 27/08* (2013.01); *F16K 41/14* (2013.01); *F16K 2200/302* (2021.08); *F16K 2200/304* (2021.08)

(58) Field of Classification Search
CPC .............................. F16K 3/265; F16K 31/1225
USPC ...................................................... 251/62, 63
See application file for complete search history.

(56) References Cited

U.S. PATENT DOCUMENTS

| | | | | |
|---|---|---|---|---|
| 3,626,693 | A | * | 12/1971 | guillot ................. G05D 16/163 415/111 |
| 4,023,466 | A | * | 5/1977 | Strassheimer .......... B29C 45/82 251/210 |
| 4,736,672 | A | * | 4/1988 | Diel ........................ F15B 13/01 137/596.2 |
| 5,884,895 | A | * | 3/1999 | Wolz ..................... B60T 17/004 251/63 |
| 8,196,893 | B2 | * | 6/2012 | Grout .................... F16K 15/148 251/63 |

(Continued)

FOREIGN PATENT DOCUMENTS

WO    2017085354 A1    5/2017

OTHER PUBLICATIONS

EP search report for EP25152965.7 dated Mar. 26, 2025.

*Primary Examiner* — Robert K Arundale
(74) *Attorney, Agent, or Firm* — Getz Balich LLC

(57) ABSTRACT

An aircraft fluid control valve is provided that includes a sleeve, a cap, first and second pistons, and first and second springs. The sleeve includes first and second inner chambers. Fluid inlet and outlet ports are disposed in the first sleeve wall. A high pressure reference port is in fluid communication with the base end and a low pressure reference port is in communication adjacent the cap end. The first piston has a center post, a base flange, and a piston head. The piston head is attached to the center post. The second piston (SP) has a SP center flange and a SP side wall. The SP side wall extends axially between a base end and a cap end. The first spring is disposed between the SP center flange and the cap. The second spring is disposed between the PH base flange and the SP center flange.

15 Claims, 13 Drawing Sheets

(56) References Cited

U.S. PATENT DOCUMENTS

| | | | | |
|---|---|---|---|---|
| 8,573,245 | B1* | 11/2013 | Jansen | F02C 7/232 |
| | | | | 137/240 |
| 9,279,367 | B2 | 3/2016 | Vinski | |
| 11,371,436 | B2 | 6/2022 | Legare | |
| 12,000,363 | B2* | 6/2024 | Zähe | F16K 17/105 |
| 2005/0242312 | A1* | 11/2005 | Kajitani | F16K 1/54 |
| | | | | 251/63.6 |
| 2010/0187451 | A1 | 7/2010 | Vinski | |
| 2010/0283333 | A1* | 11/2010 | Lemmers, Jr. | G05D 16/024 |
| | | | | 251/324 |
| 2014/0033730 | A1* | 2/2014 | Vinski | F02C 7/232 |
| | | | | 60/773 |
| 2014/0119956 | A1* | 5/2014 | Ballard | F16K 11/07 |
| | | | | 137/625.48 |
| 2019/0032811 | A1 | 1/2019 | Brito | |
| 2020/0025301 | A1* | 1/2020 | Alecu | F16K 17/065 |
| 2023/0243325 | A1 | 8/2023 | Zähe | |
| 2024/0229688 | A1* | 7/2024 | Pellerin | F01M 1/02 |

\* cited by examiner

MULTI-FUNCTION FLUID CONTROL VALVE

BACKGROUND OF THE INVENTION

1. Technical Field

The present disclosure relates to valves for controlling a fluid flow based on input from a high pressure reference and a low pressure reference.

2. Background Information

Aircraft engine oil systems are designed to lubricate and cool components that engage and disengage, such as gears, bearings, and journal bearings or static elements such as internal cavity walls to avoid overheating. To accomplish these functions, engine oil is typically circulated through an oil tank, a pressure pump, one or more cavities containing the components requiring engine oil, and then back to the oil tank. The engine oil flow pressure within the system can be controlled in different ways. For example, it is known to use a pressure regulating valve (PRV) to control system engine oil pressure. Depending on where the reference pressure is located, a PRV controlled system may be configured to provide constant oil pump outlet pressure for all of the engine component cavities, or a constant flow to respective regulated cavities. PRVs are always on the hunt to maintain a constant differential pressure between low and high pressure references and to dampen any pressure spike that may occur due to sudden accessory transient engine oil demand, fluctuating temperatures, altitude and the like.

What is needed is a device that provides improved fluid flow regulation.

SUMMARY

According to an aspect of the present disclosure, an aircraft fluid control valve is provided that includes a sleeve, a cap, a first piston, a second piston, a first spring, and a second spring. The sleeve extends axially between a base end and a cap end, and includes first and second inner chambers. The sleeve is enclosed at the base end. The first inner chamber is defined by a first sleeve wall and the second inner chamber is defined by a second sleeve wall. The first inner chamber extends from the base end to the second inner chamber. The second inner chamber extends from the cap end to the first inner chamber. A fluid inlet port and a fluid outlet port are disposed in the first sleeve wall. A high pressure reference port is in fluid communication with the base end and a low pressure reference port is in communication adjacent the cap end. The cap is in communication with the cap end of the sleeve. The first piston has a center post, a base flange, and a piston head. The center post extends axially between the base flange and a distal end. The piston head is attached to the center post at an axial position between the base flange and the distal end. The piston head (PH) includes a PH base flange and a PH side wall. The PH base flange extends outwardly from the center post. The PH side wall extends axially from the PH base flange to a PH side wall distal end. The second piston (SP) has a SP center flange and a SP side wall. The SP side wall extends axially between a SP side wall base end and a SP side wall cap end. The first spring is disposed between the SP center flange and the cap. The second spring is disposed between the PH base flange and the SP center flange.

In any of the aspects or embodiments described above and herein, the sleeve may include a base end wall disposed at the base end and the high pressure reference port may be disposed in the base end wall.

In any of the aspects or embodiments described above and herein, a portion of the center post may extend through the SP center flange and a retainer may be attached to the center post adjacent the distal end of the center post.

In any of the aspects or embodiments described above and herein, the valve may be configured to permit axial travel of the first piston within the first inner chamber, and to permit axial travel of the second piston within the first inner chamber and the second inner chamber.

In any of the aspects or embodiments described above and herein, the valve may be disposable in a closed configuration, and in the closed configuration the piston head of the first piston blocks the fluid outlet port.

In any of the aspects or embodiments described above and herein, the first and second springs may be configured such that axial travel of the first piston causes the second piston to contact the cap before the first piston axially contacts the second piston.

In any of the aspects or embodiments described above and herein, the fluid inlet port may be disposed a first axial distance from the base end of the sleeve, and the fluid outlet port may be disposed a second axial distance from the base end of the sleeve, and the second axial distance may be greater than the first axial distance thereby axially separating the fluid inlet port from the fluid outlet port.

In any of the aspects or embodiments described above and herein, the valve may be in an open configuration when the second piston is in contact with the cap.

In any of the aspects or embodiments described above and herein, in a valve fully open configuration, the first piston may be in axial contact with the second piston and the piston head of the first piston is axially separated from the fluid outlet port.

In any of the aspects or embodiments described above and herein, the second piston may include a first cavity portion defined by the SP center flange and the SP side wall on a cap end side of the SP center flange, and a second cavity portion may be defined by the SP center flange and the SP side wall on a base end side of the SP center flange. A portion of the center post may extend through the SP center flange thereby locating the distal end of the center post within the first cavity portion. A retainer may be attached to the center post adjacent the distal end of the center post within the first cavity portion.

In any of the aspects or embodiments described above and herein, the PH side wall of the piston head may be slidably received within the second cavity portion, and the second spring may extend into the second cavity portion.

In any of the aspects or embodiments described above and herein, the sleeve and the second piston may include respective mating physical features configured to positionally locate the second piston relative to the sleeve.

In any of the aspects or embodiments described above and herein, the second piston may include a rim flange disposed at the SP side wall cap end.

In any of the aspects or embodiments described above and herein, the second sleeve wall may include a pocket, and the rim flange may include a segment configured to be received within the pocket.

In any of the aspects or embodiments described above and herein, the low pressure reference port may be disposed in the second sleeve wall, and the rim flange may include a channel aligned with the low pressure reference port.

In any of the aspects or embodiments described above and herein, the aircraft fluid control valve may include a spacer in contact with the first spring, or in contact with the second spring.

According to another aspect of the present disclosure, an aircraft fluid control valve is provided that includes a sleeve, a cap, a first piston, a second piston, a first spring, and a second spring. The sleeve extends axially between a base end and a cap end and includes first and second inner chambers. The sleeve is enclosed at the base end. The first inner chamber is defined by a first sleeve wall and the second inner chamber is defined by a second sleeve wall. The first inner chamber extends from the base end to the second inner chamber, and the second inner chamber extends from the cap end to the first inner chamber. A fluid inlet port and a fluid outlet port are disposed in the first sleeve wall. A high pressure reference port is in fluid communication with the base end and a low pressure reference port is in communication adjacent the cap end. The cap is in communication with the cap end of the sleeve. The first piston has a center post, a base flange, and a piston head. The center post extends axially between the base flange and a distal end. The piston head is attached to the center post at an axial position between the base flange and the distal end. The piston head (PH) includes a PH base flange and a PH side wall. The PH base flange extends outwardly from the center post and the PH side wall extends axially from the PH base flange to a PH side wall distal end. The second piston (SP) has an outer second piston member (OSPM) and an inner second piston member (ISPM). The ISPM is nested with the OSPM. The first spring is disposed between the ISPM and the cap. The second spring is disposed between the PH base flange and the OSPM.

In any of the aspects or embodiments described above and herein, the OSPM may include an OSPM side wall and an inner member support flange, and the IPSM may include an ISPM side wall and an ISPM base wall. The first spring may be disposed between the ISPM base wall and the cap.

In any of the aspects or embodiments described above and herein, an annular region may be formed between the OSPM side wall and the ISPM side wall. The second spring may be disposed between the PH base flange and the inner member support flange of the OSPM. The second spring may be at least partially disposed in the annular region.

In any of the aspects or embodiments described above and herein, the sleeve may include a base end wall disposed at the base end. The high pressure reference port may be disposed in the base end wall, and the low pressure reference port may be disposed in the second sleeve wall. The sleeve and the OSPM may include respective mating physical features configured to positionally locate the OSPM relative to the sleeve. A portion of the center post may extend through the ISPM base wall and a retainer may be attached to the center post adjacent the distal end of the center post.

According to another aspect of the present disclosure, an aircraft fluid control valve is provided that includes a sleeve, a cap, a first piston, a second piston, a first spring and a second spring. The sleeve extends axially between a base end and a cap end, and includes first and second inner chambers. The first inner chamber extends from the base end to the second inner chamber, and the second inner chamber extends from the cap end to the first inner chamber. A fluid inlet port and a fluid outlet port are disposed in the first sleeve wall. A high pressure reference port is in fluid communication with the base end and a low pressure reference port is in communication adjacent the cap end. The cap is in communication with the cap end of the sleeve. The first piston is disposed for axial travel within the first inner chamber. The second piston is disposed for axial travel within the first inner chamber and the second inner chamber. The first spring is engaged with the second piston and the cap. The second spring is engaged with the first piston and the second piston. The valve is disposable in a closed configuration wherein the first piston blocks the fluid outlet port, and disposable in a fully open configuration wherein the first piston does not block the fluid outlet port.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
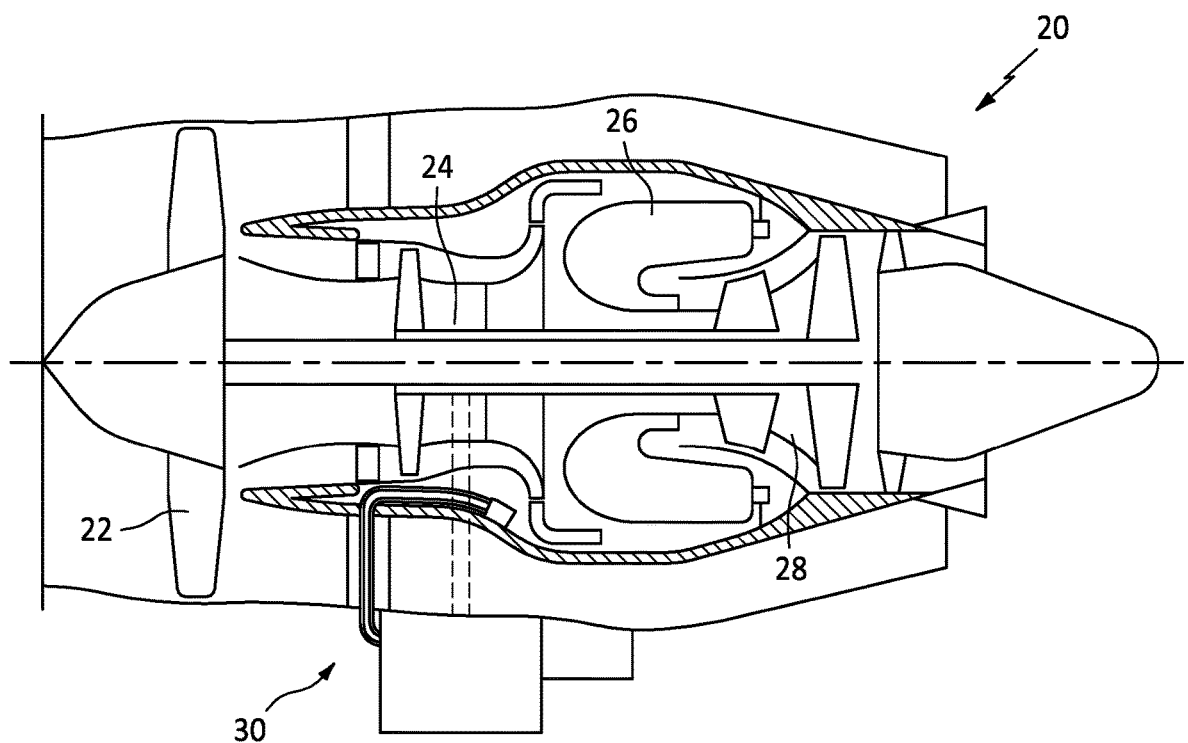
FIG. 1 is a diagrammatic view of a gas turbine engine having a lubrication system.

FIG. 1 illustrates an aircraft propulsion system having a gas turbine engine 20 that includes a fan section 22, a compressor section 24, a combustor 26, and a turbine section 28. The present disclosure may be used within conventional through-flow or reverse flow gas turbine engines, gas turbine engine types such as turbofan engines, turboprop engines, turboshaft engines, and internal combustion engines as well. The engine 20 further comprises one or more fluid systems, such as a lubrication system 30 that circulates a fluid lubricant (e.g., which may be referred to hereinafter as "oil" or "engine oil") to both lubricate and cool components; e.g., bearings, gears (e.g., within a gearbox), and other components.

Figure 2:
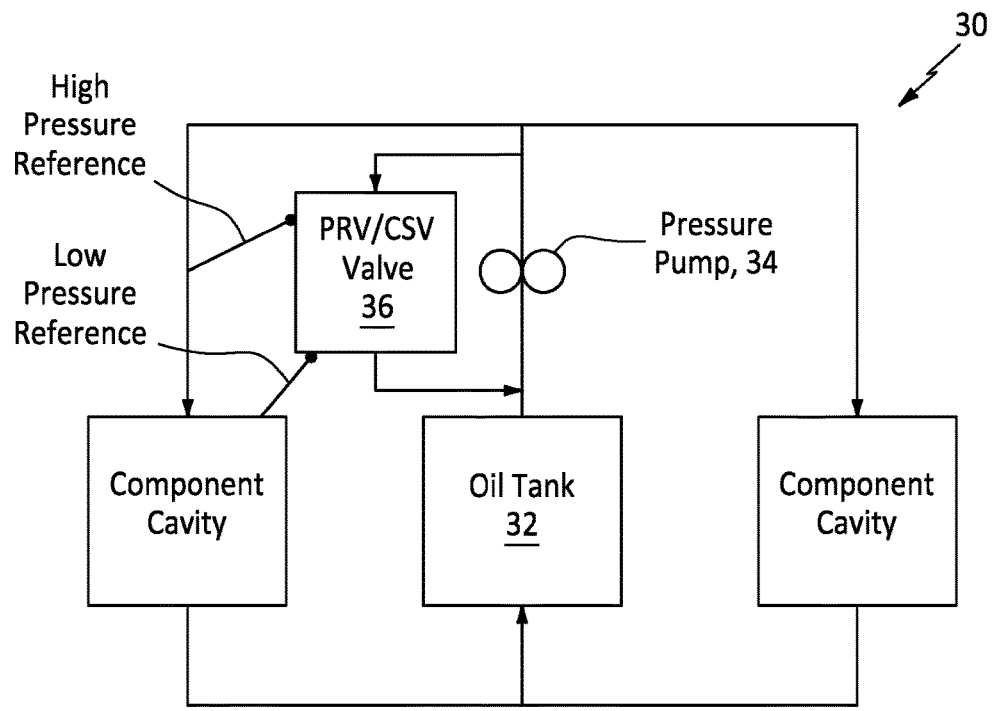
FIG. 2 is a diagrammatic illustration of a lubrication system embodiment utilizing a present disclosure PRV/CSV valve.

Referring to FIG. 2, the lubrication system 30 includes an oil tank 32, a pressure pump 34, and a present disclosure valve 36. The oil tank 32 is a reservoir configured to hold a volume of engine oil or other fluid lubricant. The oil tank 32 has at least one fluid inlet, at least one fluid outlet, and typically includes a gas (e.g., air) vent. The size and configuration of the oil tank 32 may vary depending on the system. The pressure pump 34 may be a positive displacement pump such as a gear pump. The pressure pump 34 may be in mechanical communication with the engine 20; e.g., via a gearbox. The present disclosure is not limited to any particular type of pressure pump 34; e.g., an electrically driven pump may be used. Components within the present disclosure system may be connected to one another by a respective fluid line; e.g., a pipe, a tube, or the like configured to contain and permit passage of a fluid therethrough. The term "in fluid communication" is used herein to mean that a fluid line extends between the named components and is configured to contain a fluid flow between the components.

Figure 3:
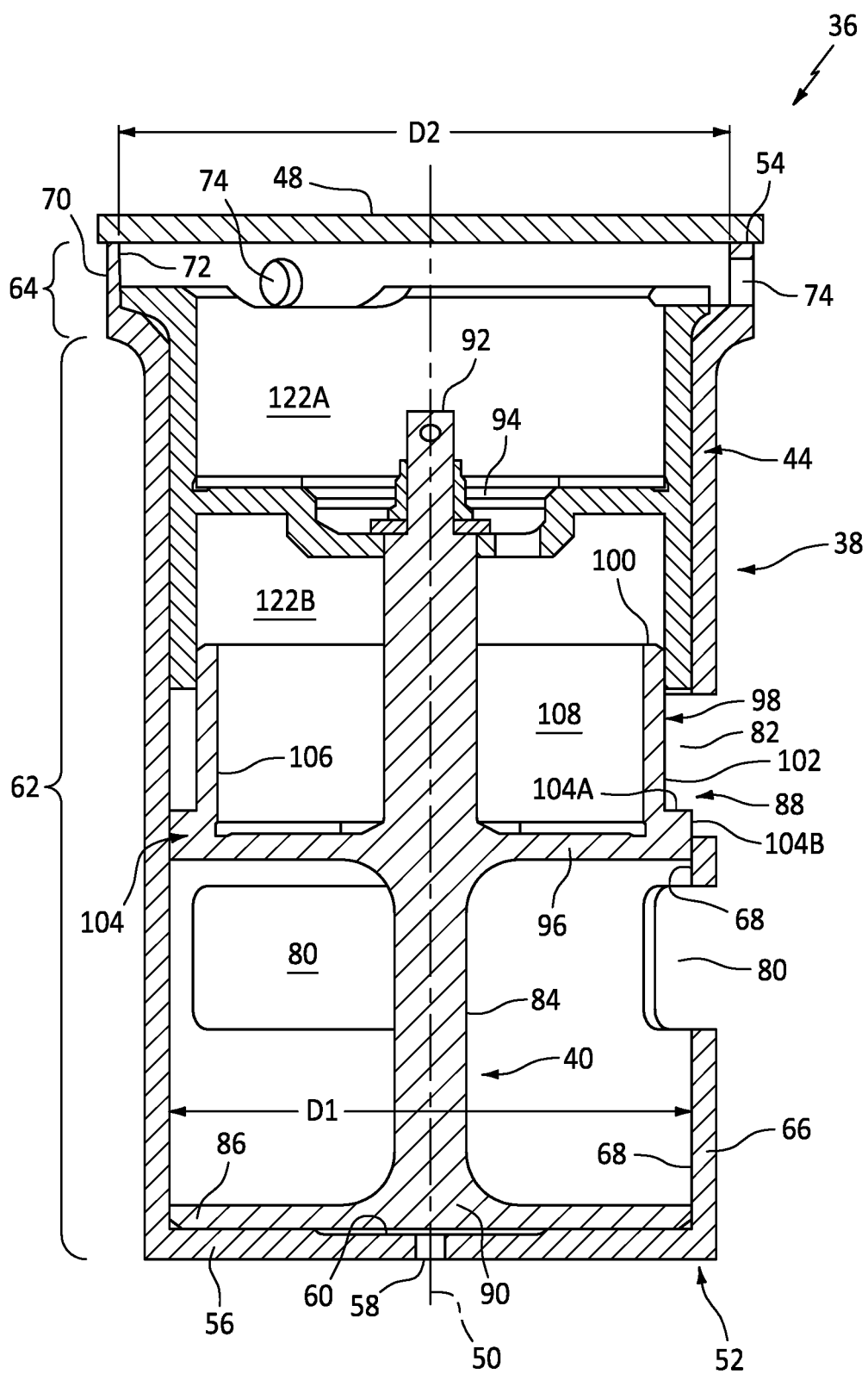
FIGS. 3-3B are diagrammatic sectioned views of a present disclosure valve embodiment.
Figure 3A:
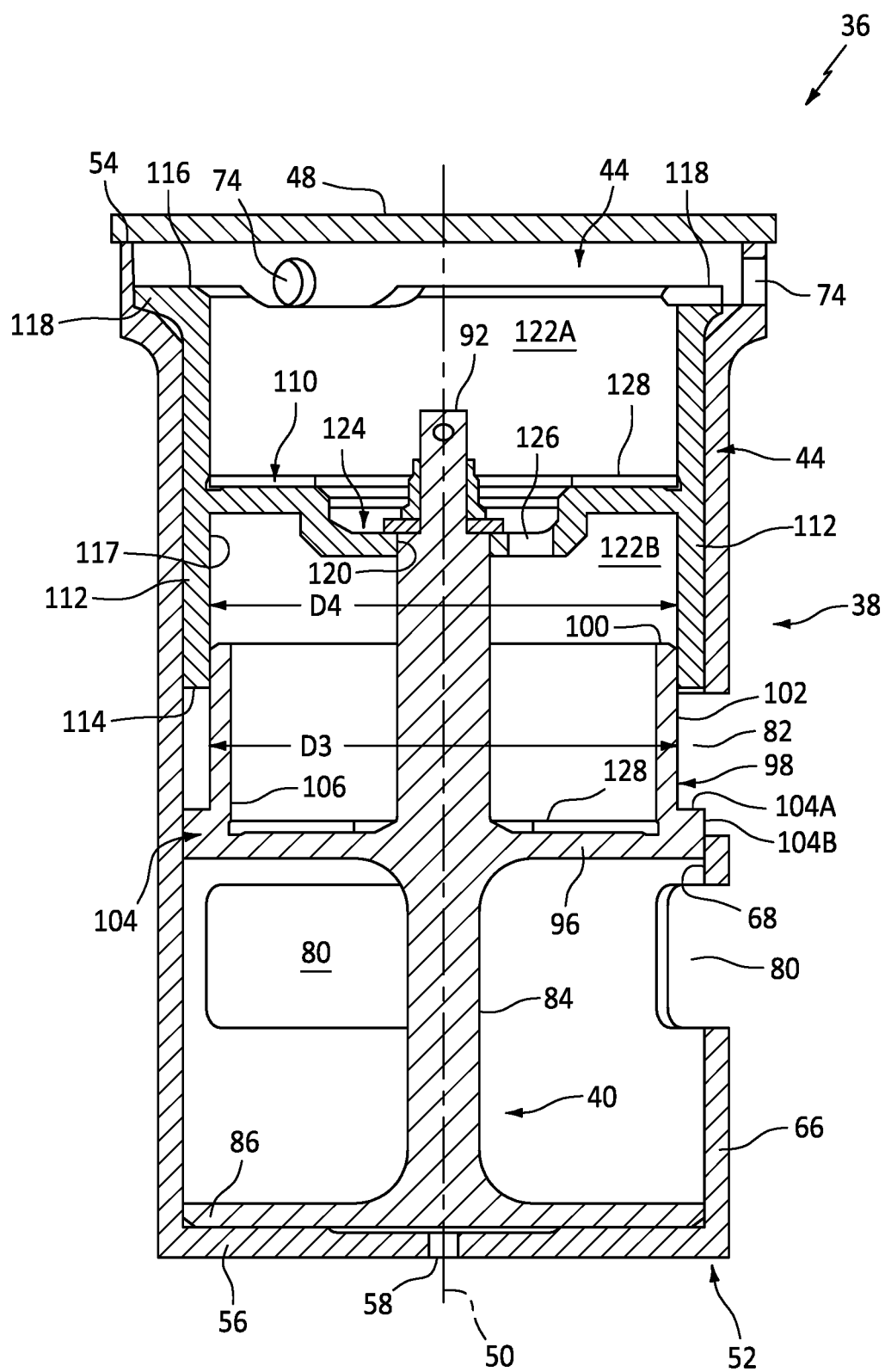
FIG. 3C is an end view of a sleeve embodiment.
Figure 3B:
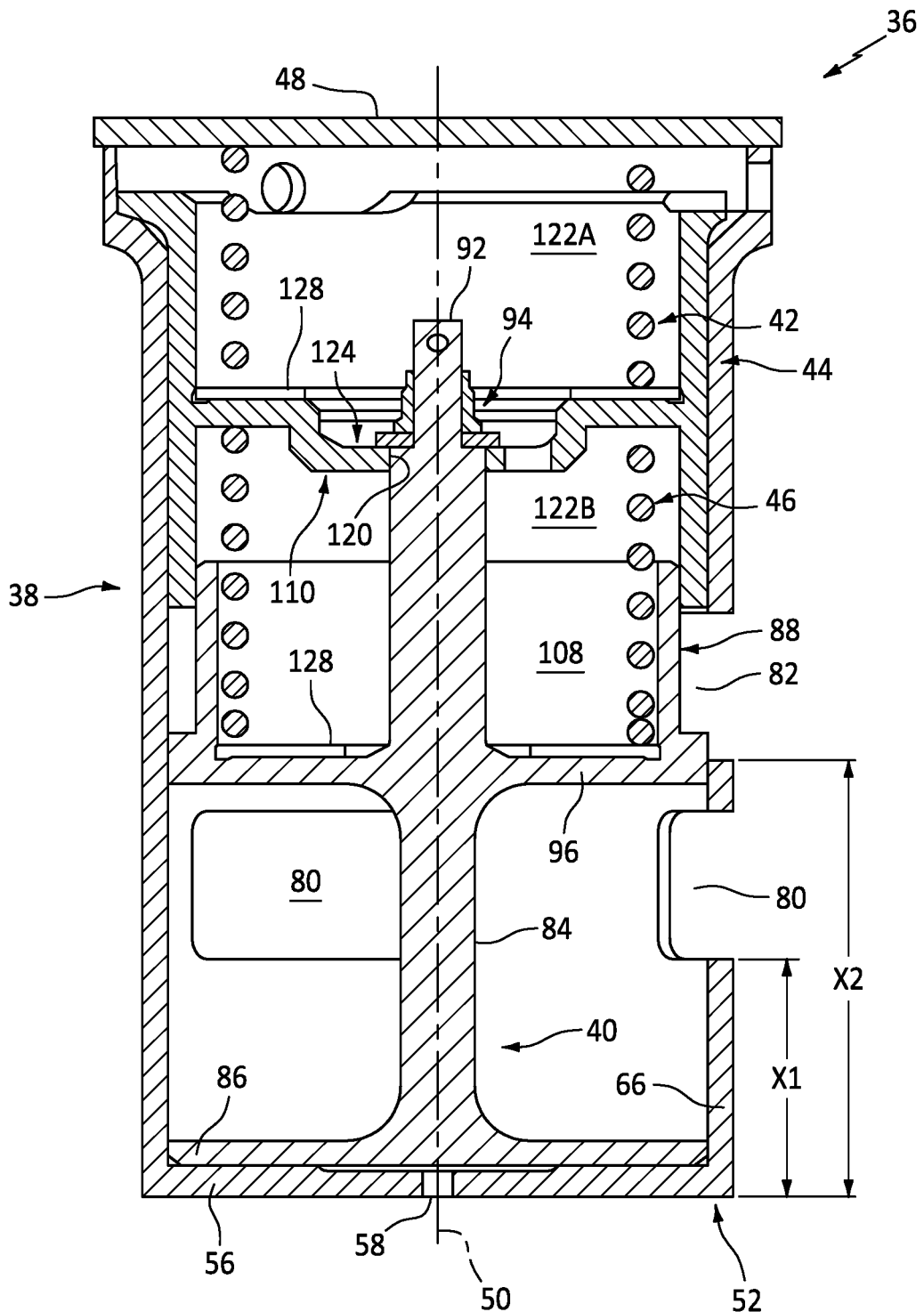

Referring to FIGS. 3-3B, aspects of the present disclosure are directed to a valve 36 ("PRV/CSV Valve") configured to provide CSV functionality and PRV functionality. The present disclosure valve 36 is described herein as utilized within the lubrication system 30 (see FIG. 2) of an aircraft propulsion system that uses liquid engine oil. The present disclosure valve 36 is not limited to applications controlling fluids in a liquid state and may be used in applications fluids in a gaseous state. The present disclosure valve 36 is also not limited to an aircraft propulsion system application, although the present disclosure provides considerable utility in an aircraft propulsion system application. The diagrammatic view of the valve 36 shown in FIGS. 3-3B reflects a valve 36 either within a non-operating engine 20 (e.g., the low pressure reference and the high pressure reference are substantially equal or the pressure differential across the low and high pressure references is inconsequential) or a valve 36 not connected to a system. The valve 36 includes a sleeve 38, a PRV piston 40, at least one PRV spring 42, a CSV piston 44, at least one CSV spring 46, a cap 48, and a center axis 50. To facilitate the description herein, FIGS. 3 and 3A illustrate the same valve 36 embodiment in the same operational configuration (i.e., valve closed) with the PRV spring(s) 42 and the CSV spring(s) 46 omitted to permit other valve 36 components to be more clearly seen. Some reference numbers shown in FIG. 3 are not shown in FIG. 3A, and vice versa, to enable features to be identified more clearly. Some reference numbers are shown in both FIGS. 3 and 3A to ensure elements are easily identifiable in both FIGS. 3 and 3A. FIG. 3B illustrates the valve 36 embodiment shown in FIGS. 3 and 3A, now including the PRV spring(s) 42 and the CSV spring(s) 46. The valve 36 configuration shown in FIGS. 3-3B is an example of a present disclosure valve 36 configuration provided to illustrate the utility of the present disclosure. The present disclosure is not limited to this particular valve 36 configuration.

Figure 3C:
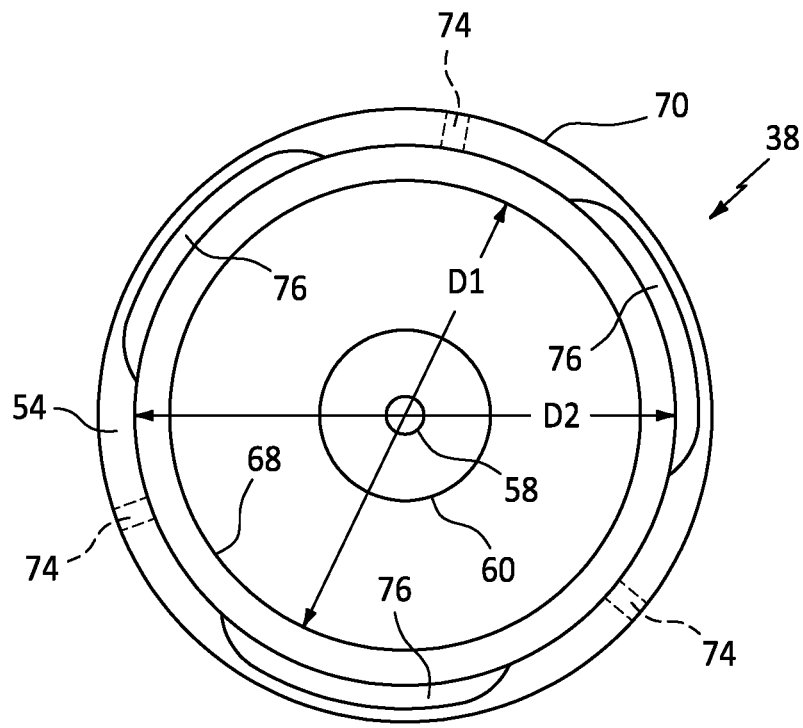

Referring to FIG. 3, the sleeve 38 extends axially along the center axis 50 between a base end 52 and a cap end 54. The cap end 54 is configured to connect with the cap 48. The cap 48 may be connected to the cap end 54 of the sleeve in a variety of different ways (e.g., mechanical fastening arrangement, or the cap 48 may be held against the cap end 54 by outside structure (not shown), or the like. The present disclosure is not limited to any mechanism for connecting the cap 48 to the cap end 54 of the sleeve 38. The sleeve base end 52 includes a base end wall 56 having a high pressure reference (HPR) port 58 that extends therethrough and may include a cavity 60 (or other depression) disposed on an inner surface surrounding the HPR port 58. The sleeve 38 includes a first inner chamber 62 and a second inner chamber 64. The first inner chamber 62 extends from the base end wall 56 to the second inner chamber 64 and is defined by a first sleeve wall 66 having a first inner wall surface 68 disposed at a first diameter (D1). The second inner chamber 64 extends from the cap end 54 to the first inner chamber 62 and is defined by a second sleeve wall 70 having a second inner wall surface 72 disposed at a second diameter (D2—see FIG. 3C). The second diameter is greater than the first diameter (D2>D1). One or more low pressure reference (LPR) ports 74 are disposed in the second sleeve wall 70. In the embodiment shown in FIGS. 3-3C and 4-4B, three LPR ports 74 are disposed in the second sleeve wall 70. In an alternative embodiment, the LPR port(s) 74 may be disposed in the cap 48.

Figure 4:
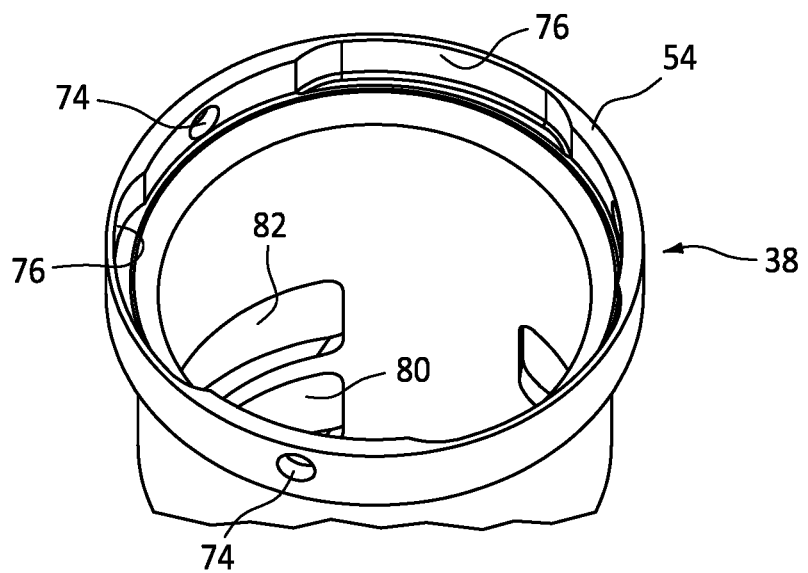
FIG. 4 is a diagrammatic partial perspective view of a valve sleeve embodiment.
Figure 4A:
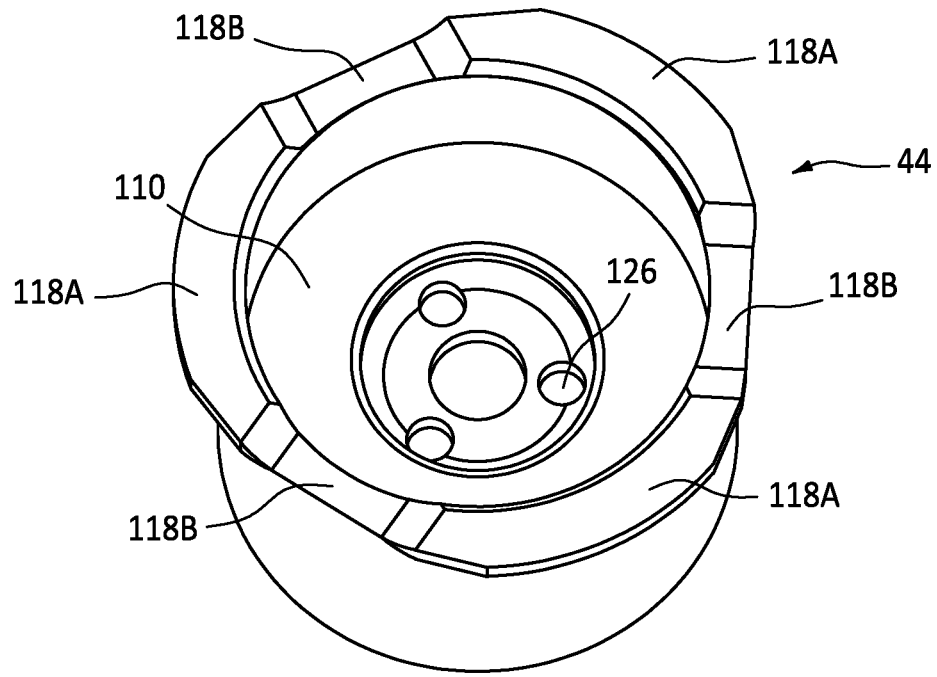
FIG. 4A is a diagrammatic partial perspective view of a CSV piston embodiment.
Figure 4B:
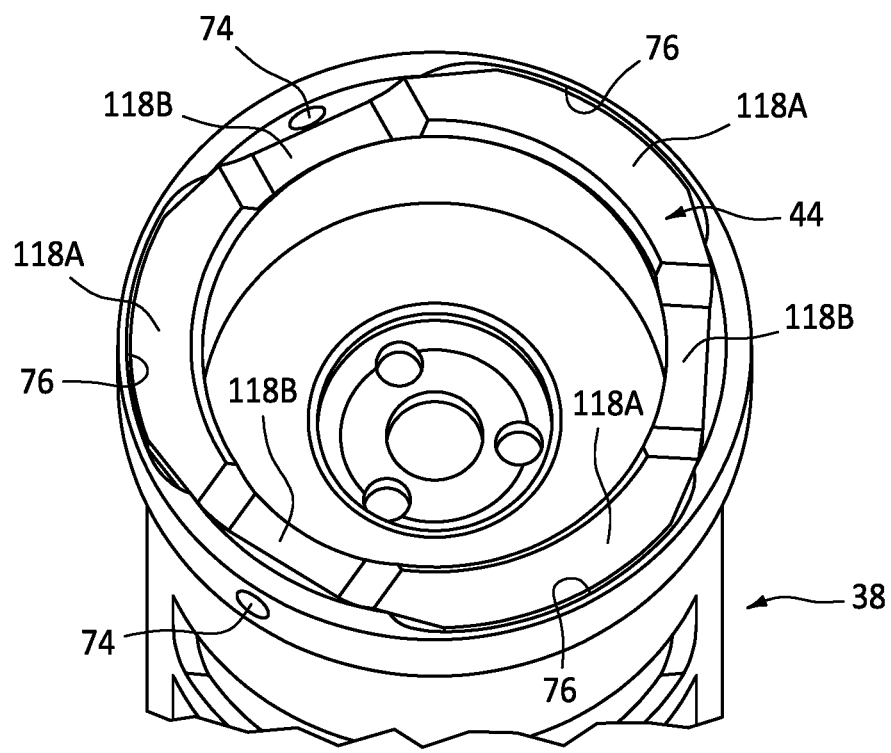
FIG. 4B is a diagrammatic partial perspective view of the valve sleeve embodiment shown in FIG. 4 coupled with the CSV piston embodiment shown in FIG. 4A.

In some embodiments, the second inner chamber 64 includes one or more physical features that mate with the CSV piston 44 to positionally locate the CSV piston 44 relative to the sleeve 38 as will be detailed herein. FIGS. 4-4B illustrate an example of a second inner chamber 64 includes a plurality of physical features configured to mate with the CSV piston 44. In this example, three pockets 76 are disposed in the second sleeve wall 70 to receive three CSV rim flange segments 118A; e.g., the pockets 76 and the rim flange segments 118A form mating male/female pairs that positionally locate the CSV piston 44 relative to the sleeve 38. The present disclosure is not limited to the example of mating features of the second inner chamber 64 and the CSV piston 44 shown in FIGS. 4-4B. The sleeve 38 embodiment shown in FIGS. 3-3B is generally cylindrical and is described as having diameters. The present disclosure is not limited to a cylindrical configuration.

Referring to FIG. 3, the sleeve 38 includes at least one fluid inlet port 80 that extends through the first sleeve wall 66 and at least one fluid outlet port 82 that extends through the first sleeve wall 66. In the embodiment shown in FIG. 3, the sleeve 38 includes a plurality of fluid inlet ports 80 and a plurality of fluid outlet ports 82. The fluid inlet ports 80 and the fluid outlet ports 82 are axially spaced from one another within the first sleeve wall 66; e.g., the fluid inlet ports 80 may be disposed at a distance X1 from the sleeve base end 52 and the fluid outlet ports 82 may be disposed at a distance X2 from the sleeve base end 52, wherein X2>X1 (see FIG. 3B). The fluid inlet ports 80 and the fluid outlet ports 82 are spaced apart around the circumference of the first inner chamber 62 (see FIG. 3).

As indicated above, the cap end 54 of the sleeve 38 is configured to connect with the cap 48; e.g., a threaded connection or the like and may include a seal (not shown) to prevent leakage therebetween. The cap 48 is configured to enclose the cap end 54 of the sleeve 38. In FIG. 3, the cap 48 is shown having a planar configuration. In an alternative embodiment, the cap 48 may include a protrusion to accommodate PRV piston 40 movement.

Still referring to FIG. 3, the PRV piston 40 includes a center post 84, a base flange 86, and a piston head 88. The center post 84 extends between a base end 90 and a distal end 92 and extends along the center axis 50 of the valve 36. As will be detailed herein, a portion of the center post 84 contiguous with the distal end 92 is configured for retaining the CSV piston 44. In the embodiment shown in FIG. 3, the portion of the center post 84 contiguous with the distal end 92 is configured for engagement with a retainer 94, For example, the portion of the center post 84 may be threaded for engagement with a retainer 94 in the form of a threaded nut. As another example, the portion of the center post 84 may include an aperture configured to receive a retainer 94 like a cotter pin or other mechanical retention element. The base flange 86 is disposed at the base end 90 of the center post 84 and extends radially outward (e.g., perpendicular to the center axis 50) to engage with the first inner wall surface 68 of the first sleeve wall 66. The PRV piston base flange 86 is geometrically configured to mate with the first inner wall surface 68 of the first sleeve wall 66 (with some clearance for the components to slide within another); e.g., if the first sleeve wall 66 is cylindrical, then the PRV piston base flange 86 has a cylindrical configuration. In some embodiments, an outer radial surface of the base flange 86 and the first inner wall surface 68 of the first sleeve wall 66 may be configured such that there is a fluid seal with no fluid leakage therebetween or only an acceptable amount of leakage therebetween; e.g., the outer radial surface of the base flange 86 may include a seal (not shown) that engages with the first inner wall surface 68.

The piston head 88 (PRV PH) includes a PRV PH base flange 96 and a PRV PH side wall 98. The PRV PH base flange 96 extends radially outward from the center post 84 (e.g., perpendicular to the center axis 50) to engage with the first inner wall surface 68 of the first sleeve wall 66. The PRV PH base flange 96 geometrically mates with the first inner wall surface 68 of the first sleeve wall 66. The PRV PH side wall 98 extends axially from the PRV PH base flange 96 to a PRV PH side wall distal end 100. The PRV PH side wall 98 includes an exterior surface 102 disposed at a diameter (D3—see FIG. 3A) that permits the PRV PH side wall 98 to be received within the second cavity portion 122B of the CSV piston 44 as will be detailed herein. The PRV piston 40 embodiment shown in FIG. 3 includes a collar 104 having a piston contact surface 104A and an outer radial surface 104B. The outer radial surface 104B is configured to mate with the first inner wall surface 68 of the sleeve wall 66; e.g., to isolate the fluid inlet port(s) 80 from the fluid outlet port(s) 82 when the valve is in a closed configuration, and to center the PRV piston 40 within the sleeve 38. The piston contact surface 104A is configured to contact the base end 114 of the CSV piston side wall when the valve 36 is in a fully open configuration as will be detailed herein. The PRV PH side wall 98 includes an interior surface 106 that in combination with the PRV PH base flange 96 defines a PRV PH inner chamber 108 (see FIG. 3).

Referring to FIG. 3A, the CSV piston 44 includes a CSV center flange 110 and an CSV side wall 112. The CSV side wall 112 extends axially between a base end 114 and a cap end 116 and includes an interior surface 117. A rim flange 118 is disposed at the cap end 116. The rim flange 118 extends radially outward. As detailed above, in some embodiments the rim flange 118 may be configured to include one or more physical features that mate with physical features of the sleeve 38 to positionally locate the CSV piston 44 relative to the sleeve 38. FIGS. 4-4B illustrate an example of a rim flange 118 having three segments 118A that are configured to mate with pockets 76 disposed in the second sleeve wall 70. In the rim flange 118 embodiment shown in FIGS. 4-4B, the rim flange 118 also includes three channels 118B, with each channel 118B disposed between a pair of the rim flange segments 118A. The channels 118B are configured to provide fluid communication between the LPR ports 74 disposed in the second sleeve wall 70 and the interior of the valve 36.

The interior surface 117 of the CSV side wall 112 defines an interior cavity having an inner diameter (D4; D4>D3). The CSV center flange 110 extends across the interior cavity between opposing CSV side wall 112 portions and includes an aperture 120 for receiving the distal end 92 of the PRV piston center post 84. The CSV center flange 110 is engaged with the CSV side wall portions 112 between the base end 114 and the cap end 116 of the CSV side wall 112; e.g., in the embodiment shown in FIG. 3A, the CSV center flange 110 is engaged with the CSV side wall portions 112 at about the middle point between the base end 114 and the cap end 116. The interior cavity of the CSV piston 44 includes a first cavity portion 122A disposed between the CSV center flange 110 and the cap end 116 of the CSV side wall 112, and a second cavity portion 122B disposed between the CSV center flange 110 and the base end 114 of the CSV side wall 112. In the embodiment shown in FIG. 3A, the CSV center flange 110 includes a pocket 124 that is open to the first cavity portion 122A side. The aperture 120 for receiving the distal end 92 of the PRV piston center post 84 is aligned with the pocket 124. As will be explained herein, the CSV center flange pocket 124 may be configured to receive a retainer 94 (see FIG. 3). The present disclosure does not require a CSV center flange 110 having a pocket 124; e.g., as indicated herein in some embodiments the cap 48 may include a protrusion to accommodate PRV piston 40 movement. In the embodiment shown in FIG. 3A, the CSV center flange 110 also includes one or more fluid flow apertures 126 that allow fluid to pass between the first and second cavity portions 122A, 122B.

Referring to FIG. 3B, the PRV spring 42 and the CSV spring 46 are disposed in a series arrangement within the valve 36, utilizing the spring displacements and spring rates in the operation of the valve 36. As will be detailed herein, in some present disclosure embodiments the CSV spring 46 may be disposed between the PRV piston 40 and the CSV piston 44, and the PRV spring 42 may be disposed between the CSV piston 44 and the cap 48. In other embodiments, the PRV spring 42 may be disposed between the PRV piston 40 and the CSV piston 44, and the CSV spring 46 may be disposed between the CSV piston 44 and the cap 48. In some embodiments, the present disclosure may include one or more spacers 128 (e.g., washers) to preload the PRV spring 42, or the CSV spring 46, or both. Spacers 128 are not required, however. FIG. 3B diagrammatically illustrates a spacer 128 disposed between the PRV PH base flange 96 and the PRV spring 42. The thickness of the spacer 128 is chosen to cause PRV spring 42 to be compressed (i.e., preloaded) by a predetermined amount. In similar fashion, a spacer 128 is disposed between the CSV center flange 110 and the CSV spring 46 and the thickness of the spacer 128 is chosen to cause CSV spring 46 to be compressed by a predetermined amount. The present disclosure is not limited to any particular number of spacers 128 or thickness of spacers 128 (e.g., the amount of spring preloading), or the position of the spacers 128 relative to the springs 42, 44.

Using the present disclosure valve 36 embodiment shown in FIG. 3B as an example, the assembly process may include first assembling the PRV piston 40 and CSV piston 44 together. For example, one or more spacers 128 and the CSV spring 46 may be inserted into the PRV PH inner chamber 108 and then the second cavity portion 122B of the CSV piston 44 may be slid over the PRV piston head 88 until the distal end 92 of the PRV center post 84 extends through aperture 120 disposed in the pocket 124 of the CSV center flange 110. A retainer 94 (e.g., a threaded nut) may be engaged with the distal end 92 of the PRV center post 84 and/or a cotter pin inserted to maintain the PRV piston 40 and the CSV piston 44 coupled together. It should be noted that when the PRV piston 40 and the CSV piston 44 are coupled together, the retainer 94 limits the relative travel of the center post 84 relative to the CSV piston 44, but it does not fix the PRV piston 40 and the CSV piston 44 together; e.g., see the positions of the center post 84 and fastener relative to the CSV piston 44 in FIG. 5 or 5A versus the positions of the center post 84 and fastener relative to the CSV piston 44 in FIG. 5B. As indicated above, when the PRV piston 40 and the CSV piston 44 are coupled, the CSV spring 46 may be slightly compressed/preloaded. The coupled PRV piston 40 and CSV piston 44 may then be inserted into the interior of the sleeve 38 so that the PRV piston base flange 86 is in contact with the sleeve base end wall 56. The circumferential position of the CSV piston 44 is determined by the mating rim flange segments 118A and the pockets 76 (see FIGS. 4-4B). The PRV spring 42 (and possibly a spacer 128) is then inserted into the first cavity portion 122A of the CSV piston 44. The cap 48 may then be attached to the sleeve 38. As indicated above, the PRV spring 42 may be slightly compressed/preloaded between the cap 48 and the spacers 128/CSV center flange 110. The present disclosure valve 36 is not limited to any particular method of assembly.

In some embodiments, the present disclosure valve 36 may be configured so that the CSV spring 46 and the PRV spring 42 are not physically interchangeable; i.e., each can only fit within the valve 36 in an intended manner to avoid assembly error.

Figure 5:
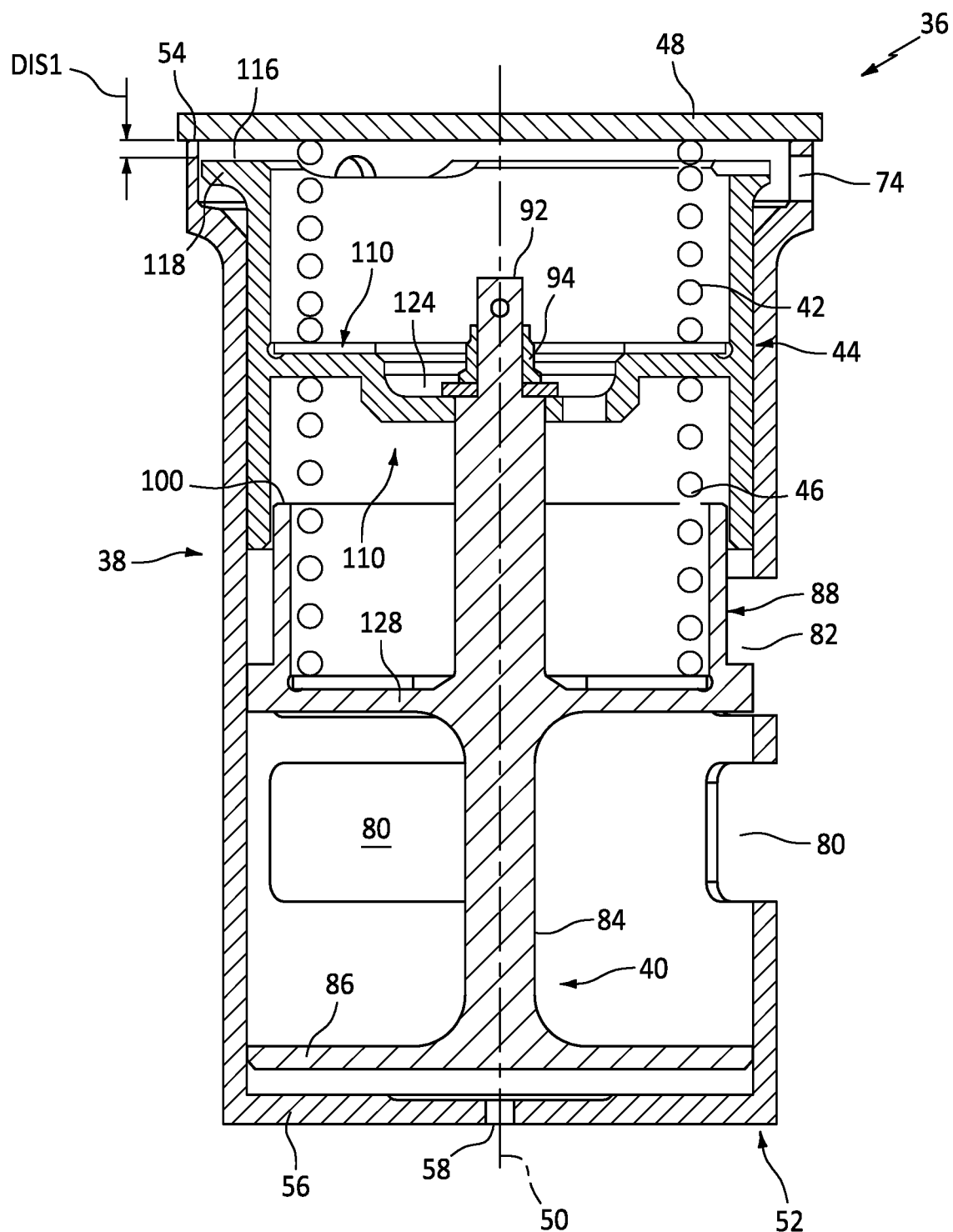
FIGS. 5-5B are diagrammatic sectioned views of a present disclosure valve embodiment.
Figure 5A:
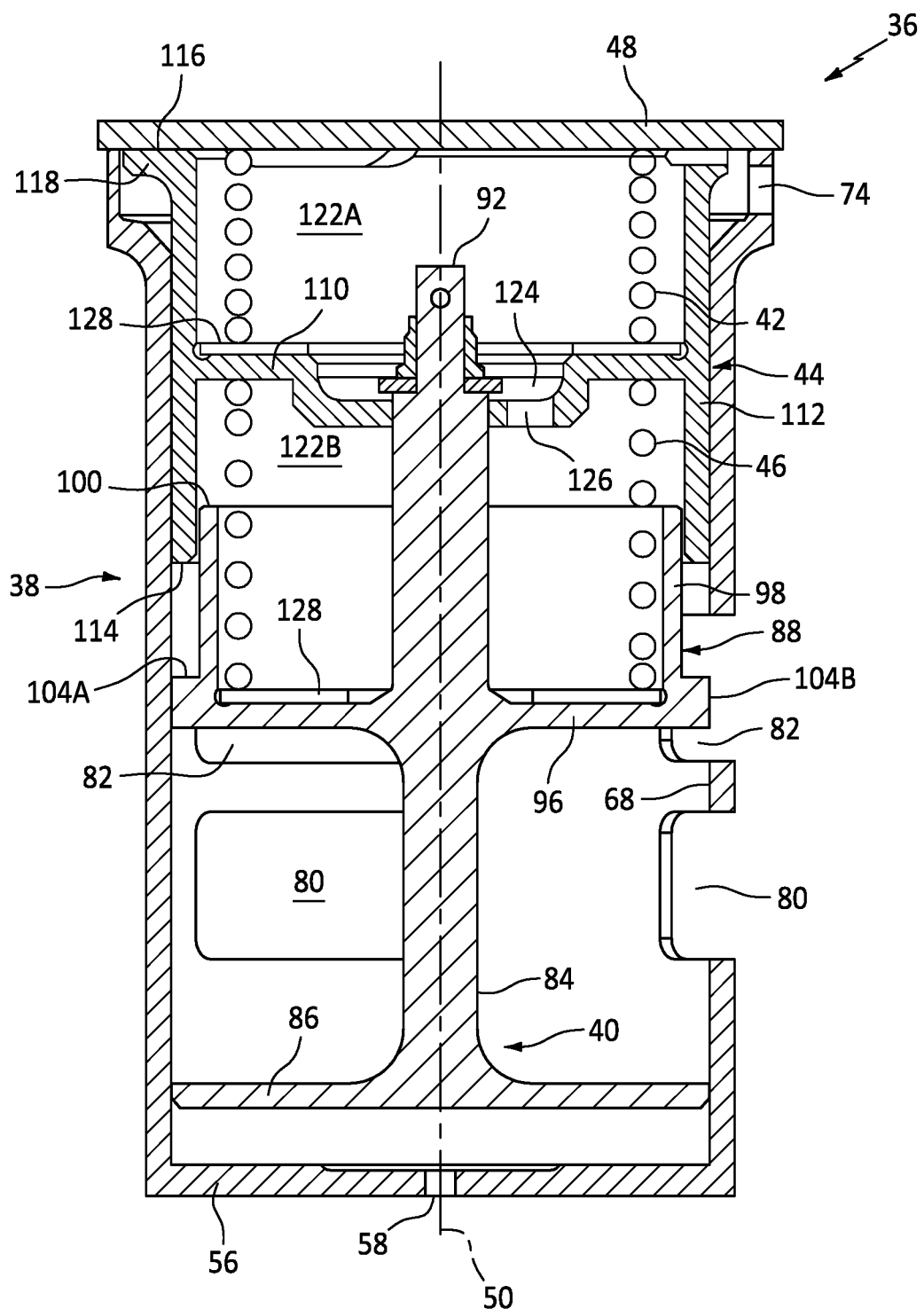
Figure 5B:
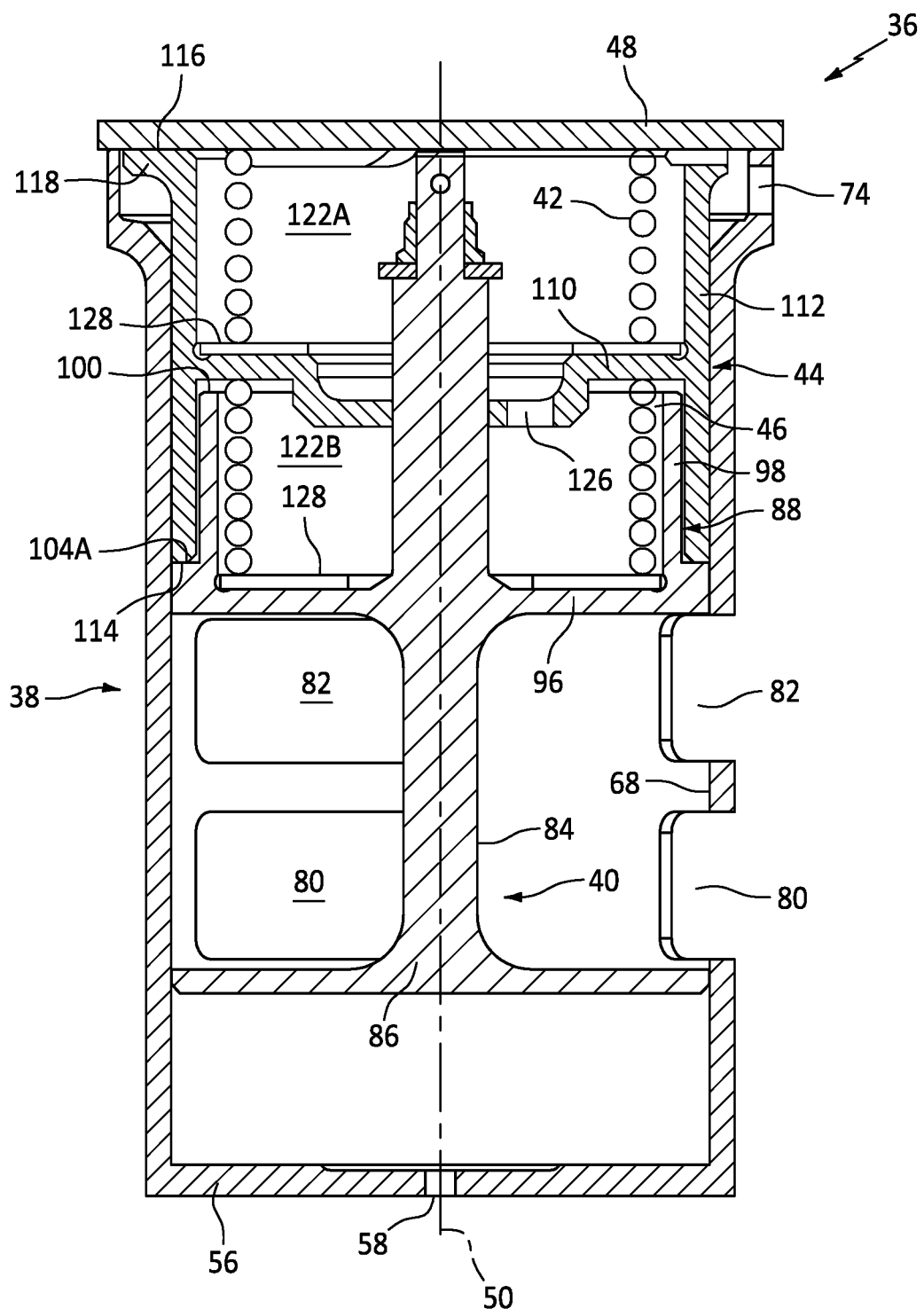

FIGS. 3B and 5-5B illustrate the present disclosure valve 36 embodiment in a plurality of different configurations to illustrate the operation of the valve 36.

FIG. 3B illustrates the valve 36 in a closed configuration. The PRV piston 40 is disposed in contact with the sleeve base end wall 56 and a portion of the PRV piston head 88 is aligned with and therefore substantially blocking the fluid outlet ports 82. In this PRV piston 40 position, both the CSV spring 46 and the PRV spring 42 are slightly compressed.

FIG. 5 illustrates the PRV piston 40 positioned such that the PRV piston base flange 86 is slightly spaced apart from the sleeve base end wall 56 and the PRV piston head 88 is substantially aligned with and therefore substantially blocking the fluid outlet ports 82. In this PRV piston 40 position, both the CSV spring 46 and the PRV spring 42 are slightly compressed. Also in this position, the cap end 116 of the CSV side wall 112 is spaced apart from the cap 48 (shown as distance "DIS1") and the PRV PH side wall distal end 100 is spaced apart from the CSV center flange 110. The LPR ports 74 are in fluid communication with the low pressure reference (not shown) and the HPR port 58 is in fluid communication with the high pressure reference (not shown). There is a force balance across the valve 36 with the CSV spring 46, PRV spring 42, and fluid pressure from the LPR ports 74 on the one side of the balance, and fluid pressure from the HPR port 58 on the other side.

FIG. 5A illustrates the PRV piston 40, and the CSV piston 44 moved axially toward the cap 48; i.e., the distance between the sleeve base end wall 56 and the PRV piston base flange 86 is greater than the distance shown in FIG. 5. In FIG. 5A, the PRV piston 40 is positioned such that the fluid outlet ports 82 are partially open. In this PRV piston 40 position, the cap end 116 of the CSV side wall 112 is now in contact with the cap 48 (i.e., distance "D1" as shown in FIG. 8 equals zero in FIG. 5A). The relative positions of the PRV PH side wall distal end 100 and the CSV center flange 110 are substantially unchanged from those shown in FIG. 5. In this "partially open" valve 36 configuration, the PRV spring 42 is at its maximum compression because the CSV piston 44 is in contact with the cap 48. Because the CSV piston 44 is in contact with the cap 48, the PRV spring 42 participation in the force balance across the valve 36 is at its maximum and will remain constant with further PRV piston 40 upwards movement, as CSV piston flange 116 mates with cover 48, hence preventing any further compression of PRV spring 42. In the configuration shown in FIG. 5A, the force balance across the valve 36 has the PRV spring 42 and the CSV spring 46 and fluid pressure from the LPR ports 74 on the one side, and fluid pressure from the HPR port 58 on the other side. It should be noted that with the CSV piston 44 is in contact with the cap 48, there is still fluid communication between the first cavity portion 122A of the CSV piston 44 and the LRP ports 74 via the channels 118B disposed in the CSV piston rim flange 118; e.g., FIG. 4B shows the alignment between the channels 118B and the LRP ports 74. It should also be noted that the fluid flow aperture(s) 126 disposed in the center flange 110 of the CSV piston 44 allows fluid at the pressure from the LRP ports 74 to enter into the region defined by the PRV PH inner chamber 108 and the second cavity portion 122B of the CSV piston 44; i.e., where the CSV spring 46 resides.

FIG. 5B illustrates the valve 36 in a fully open configuration. The PRV piston 40 is moved axially toward the cap 48 a maximum distance; i.e., the distance between the sleeve base end wall 56 and the PRV piston base flange 86 is greater than the distances shown in FIGS. 5 and 5A. In FIG. 5B, the PRV piston 40 is positioned such that the fluid outlet ports 82 are fully open. In this PRV piston 40 position, the cap end 116 of the CSV side wall 112 is in contact with the cap 48; i.e., the same position as in FIG. 5A. In FIG. 5B, the piston contact surface 104A of the collar surface 104 is in contact with the base end 114 of the CSV piston side wall 112, and as a result the CSV spring 46 is at its maximum compression because the PRV piston 40 is axially bottomed out on the CSV piston 44; i.e., the PRV piston 40 cannot move axially any further toward the CSV piston 44. In the configuration shown in FIG. 5B, the fluid pressure from the HPR port 58 forces the valve 36 in the fully open configuration.

When the fluid pressure from the HPR port 58 decreases, the PRV spring 42 and the CSV spring 46 and the fluid pressure from the LPR port(s) 74 will force the PRV piston 40 in the opposite direction, causing the fluid outlet ports 82 to at least partially close; i.e., the reverse of the piston movements described above. If the fluid pressure from the HPR port 58 decreases sufficiently, the valve 36 will return to an fluid outlet port 82 fully closed configuration as shown in FIG. 5.

Figure 6:
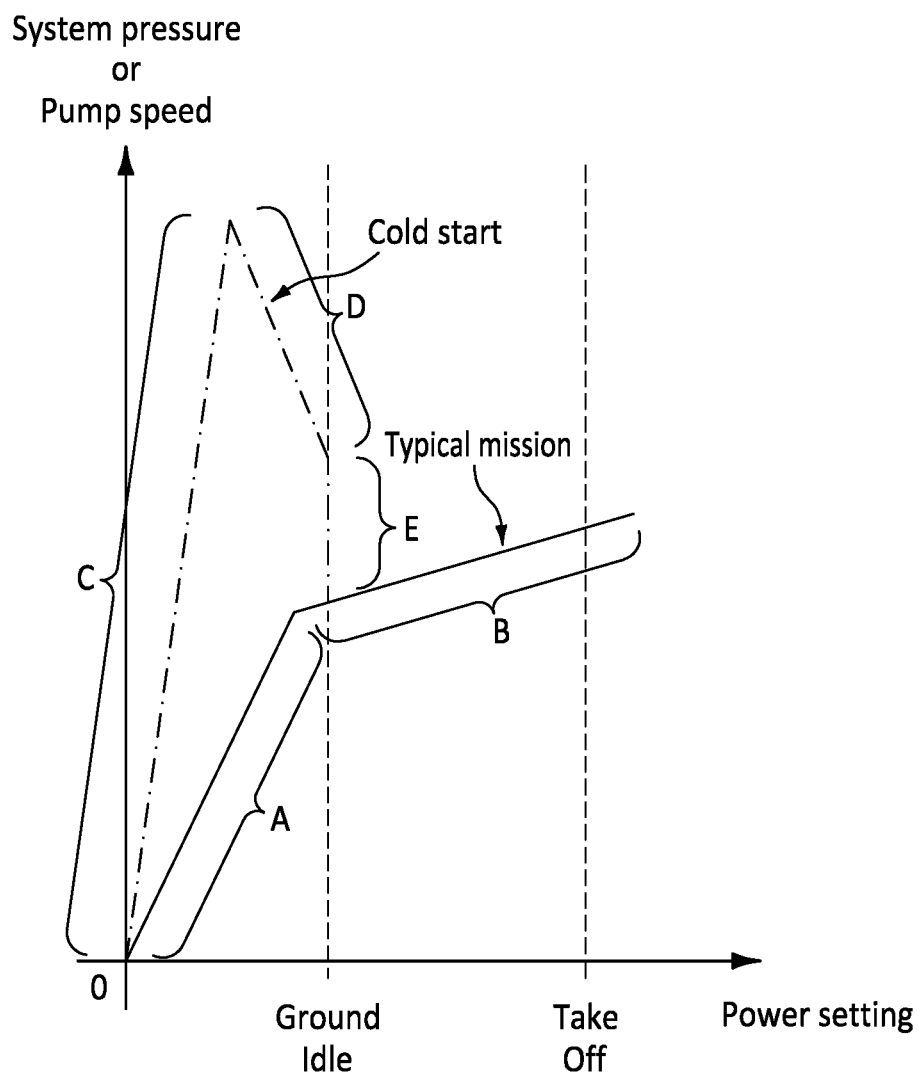
FIG. 6 is a graph of system pressure versus power setting illustrating a typical mission profile and a cold start profile.

FIG. 6 is a graph of system pressure (or pump speed) versus power setting that diagrammatically illustrates a typical mission line and a cold start line relative to a power setting at ground idle and takeoff. Lines A and B represent a typical mission profile from start up through takeoff. Lines C and D represent a cold start profile from start up to ground idle. Line E represents a transition from a cold start profile to a typical mission profile. Embodiments of the present disclosure pump are not limited to configurations that regulate fluid flow between operational conditions/power settings such as start-up and ground idle (GI). Embodiments of the present disclosure valve may also be configured to regulate flow at other operational conditions/power settings. As described herein, the PRV valve function and/or the CSV valve function of the present valve may be adjusted, for example, using combinations of spacers 128 (e.g., vary the height of the spacers 128 to vary the amount of spring preload) and different spring rates. Hence, embodiments of the present disclosure valve may be configured for different operational conditions/power settings (e.g., cold start, ground idle, take off, and the like) to produce the desired fluid flow regulation.

In the operational progression represented by line A, the engine is started and approaches a ground idle power setting. In this progression, that valve 36 is initially fully closed (e.g., a valve 36 configuration like that shown in FIG. 3B)

and progresses to a PRV cracking pressure. The valve 36 configuration in FIG. 5 illustrates an amount of fluid pressure from the high pressure reference that has slightly moved the PRV piston 40; i.e., the PRV piston base flange 86 is slightly spaced apart from the sleeve base end wall 56 and the PRV piston head 88 is substantially aligned with and therefore substantially blocking the fluid outlet ports 82. At this point, the PRV piston 40 (functionally performing as a PRV valve) is ensuring acceptable engine oil pressure margin for the propulsion system components (e.g., bearings, gear boxes, or the like) subject to the low and high pressure references. Line B represents a normal operational mission with the PRV piston 40 (functionally performing as a PRV valve) performing most of the engine oil flow control through the valve 36.

In the operational progression represented by line C, the engine is started and the system pressure rises rapidly as a result of the high viscosity of the engine oil due to cold engine oil temperature. In this progression, the valve 36 is initially fully closed (at position "0"), which is a valve 36 configuration like that shown in FIG. 3B. From there, the PRV piston 40 rapidly contacts the CSV piston 44; i.e., the PRV spring 42 is compressed to its maximum state when the CSV piston 44 contacts the valve cap 48. As the system pressure continues to rise, the PRV piston 40 travels axially toward the CSV piston 44 (compressing the CSV spring 46) until the fluid outlet ports 82 are fully open; e.g., as diagrammatically shown in FIG. 5B. The intersection between lines C and D represents the oil outlet port fully open configuration. Line D represents the operational progression wherein the temperature of the engine oil is increasing and the viscosity of the engine oil is decreasing. During this progression, the CSV piston 44 (functionally performing as a CSV valve) begins to return (i.e., the CSV spring 46 begins to expand) and the fluid outlet ports 82 begin to close; e.g., see FIG. 5A. At the point where line D intersects line E, the temperature of the engine oil may not be high enough for the operator (or a control system) to change the engine power setting to takeoff power. In that scenario, the operator (or the engine control system) may control the engine to dwell at the ground idle power setting until the engine oil temperature has increased to a predetermined temperature setting. Once the engine oil temperature reaches the predetermined temperature setting, then operational control of the valve 36 transitions to the typical mission profile; e.g., line B.

Figure 7:
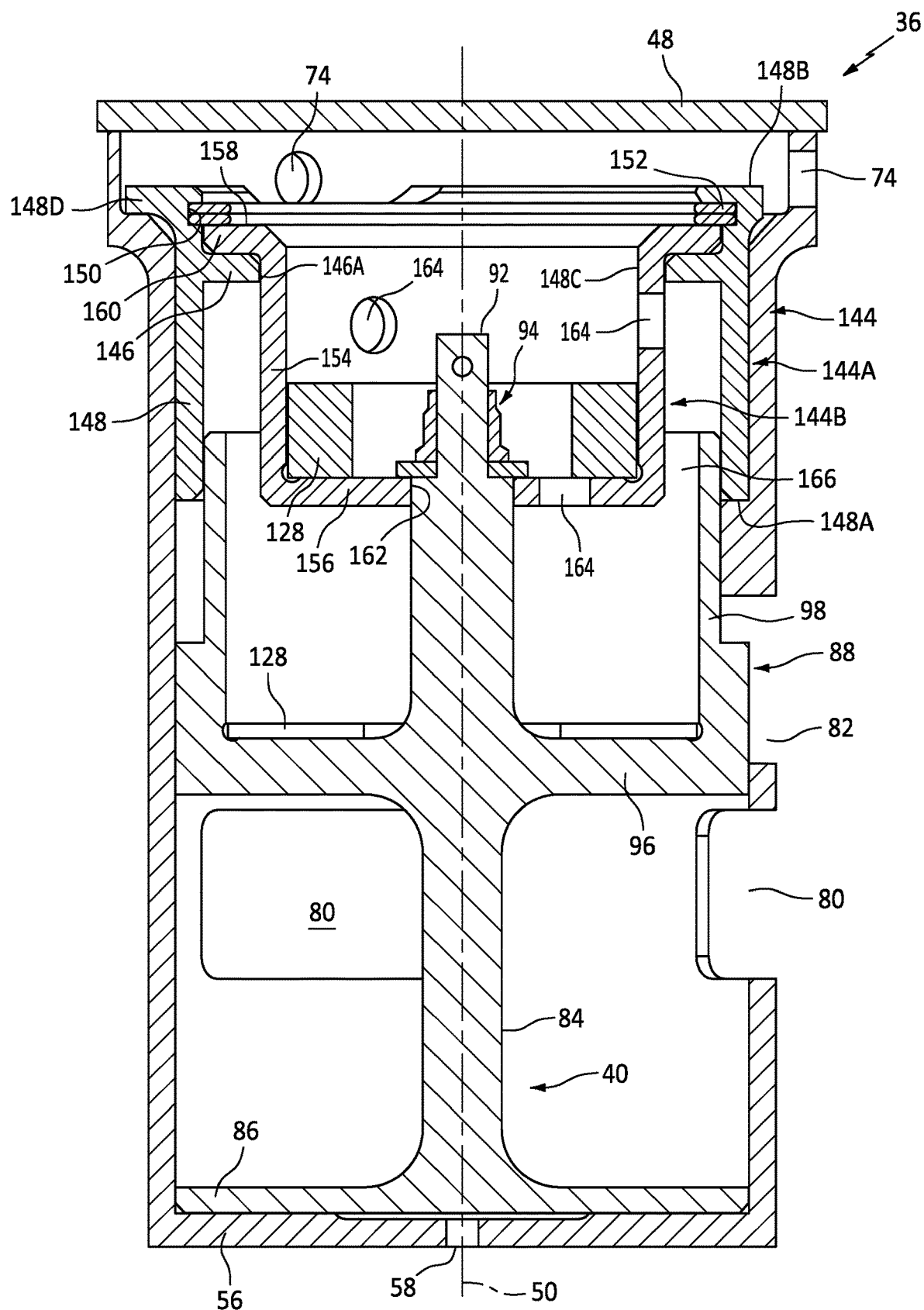
FIGS. 7-7B are diagrammatic sectioned views of a present disclosure valve embodiment.
Figure 7A:
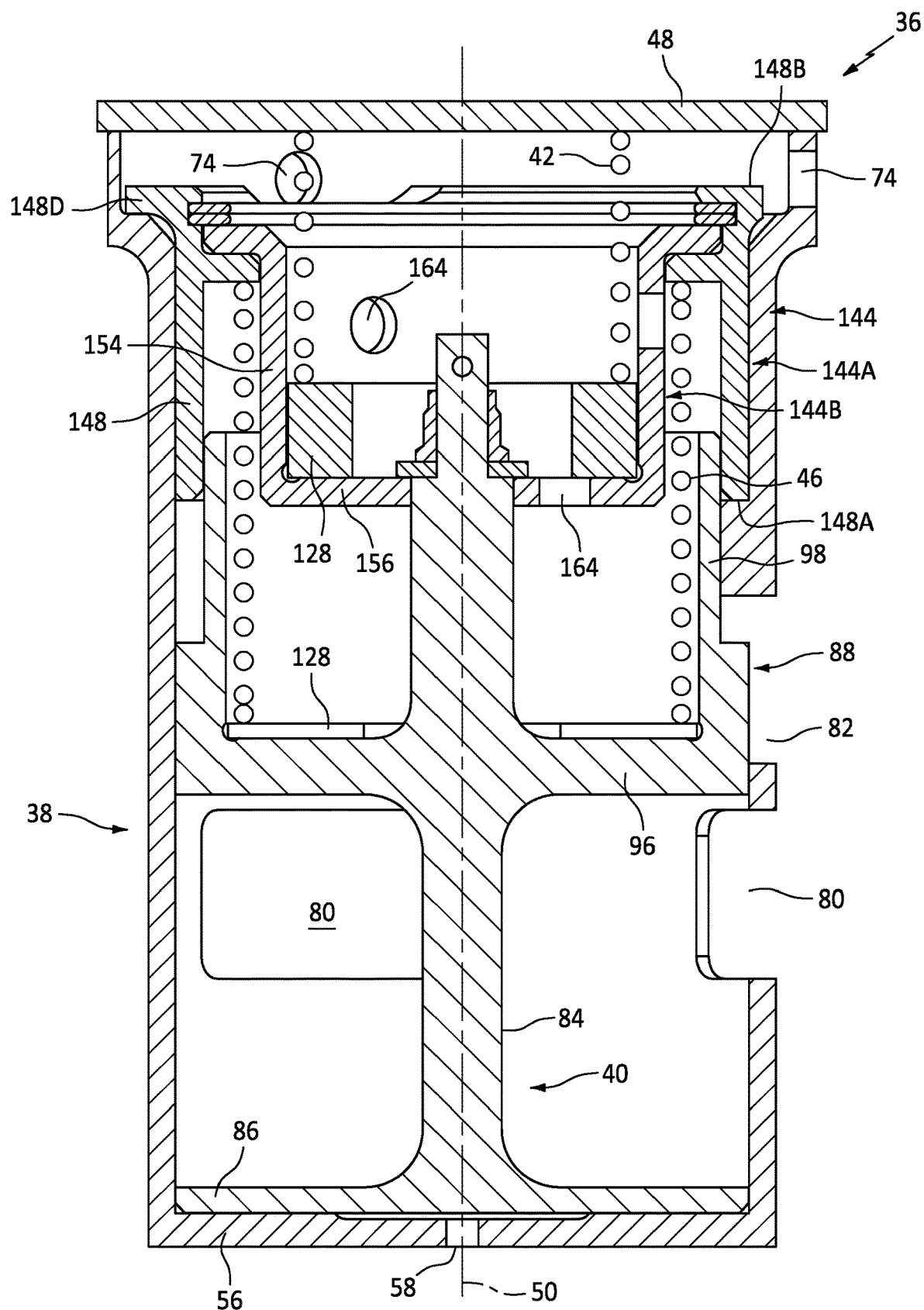
Figure 7B:
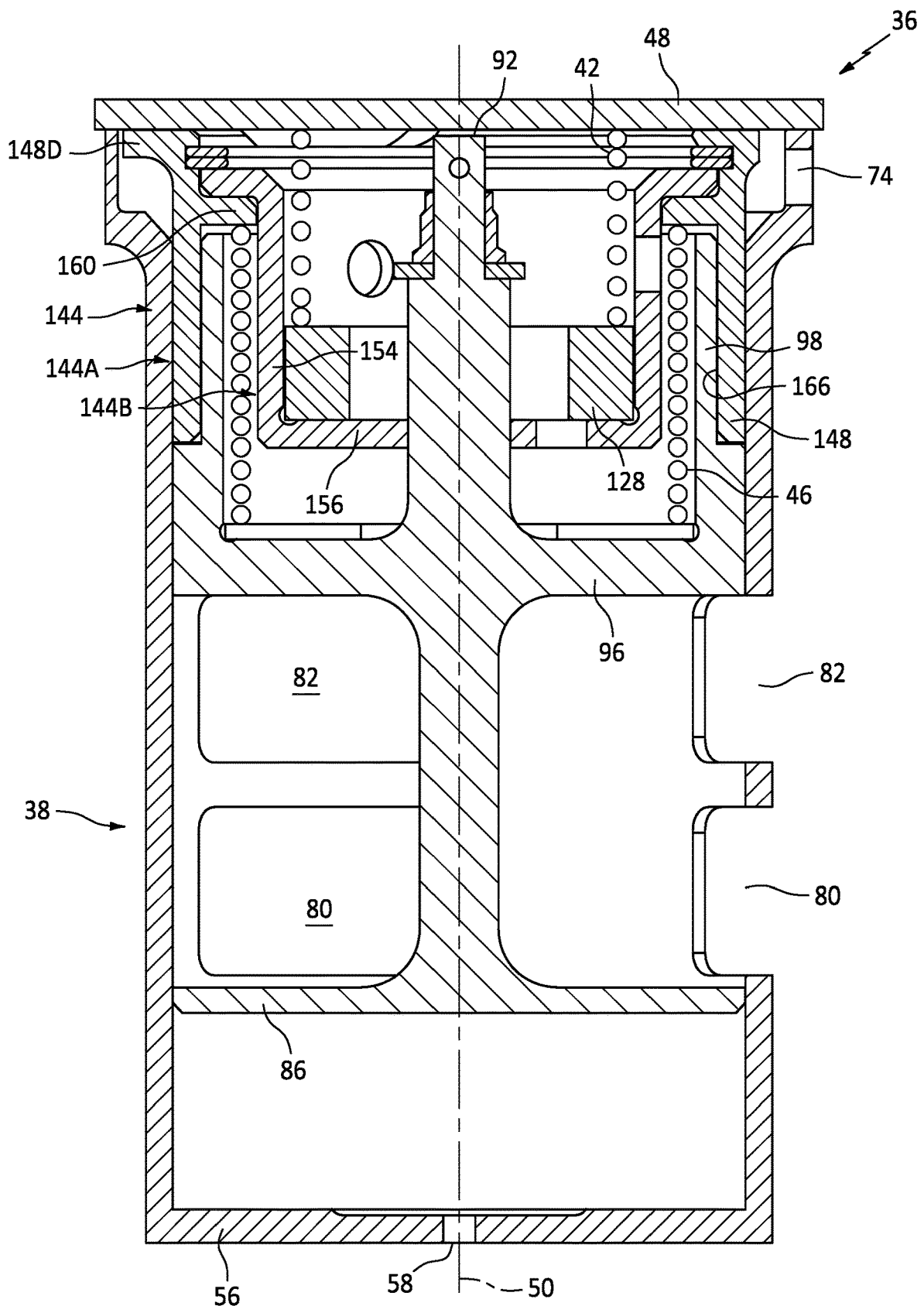

As indicated above, the valve 36 configuration shown in FIGS. 3-3B is a non-limiting example of a present disclosure valve 36 configuration. Referring to FIGS. 7-7B, another example of a valve 36 configuration is shown. To facilitate the description herein, FIG. 7 illustrates the valve 36 embodiment with the PRV spring(s) 42 and the CSV spring(s) 46 omitted to permit other valve components to be more clearly seen. The PRV spring(s) 42 and the CSV spring(s) 46 are shown in FIG. 7A. This configuration includes a sleeve 38, a PRV piston 40, at least one PRV spring 42, a CSV piston 144, at least one CSV spring 46, a cap 48, and a center axis 50. The sleeve 38 and the PRV piston 40 are similar to those shown in FIGS. 3-3B and described above. In this embodiment, the CSV piston 144 includes an outer CSV (OCSV) piston member 144A and an inner CSV (ICSV) piston member 144B. FIGS. 7-7B illustrate an OCSV piston member 144A and an ICSV piston member 144B that are independent of one another. In alternative embodiments, the OCSV piston member 144A and the ICSV piston member 144B may be attached to one another, or may be integral with one another. The OCSV piston member 144A includes an inner member support flange 146 and an OCSV side wall 148. The OCSV side wall 148 may be configured as described above and shown in FIGS. 3-3B; e.g., extending axially between a OCSV base end 148A and an OCSV cap end 148B, having an interior surface 148C, and an OCSV rim flange 148D disposed at the OCSV cap end 148B. The OCSV rim flange 148D may be configured as described above; e.g., having one or more physical features that mate with physical features of the sleeve 38 to positionally locate the CSV piston 44 relative to the sleeve 38. The inner member support flange 146 extends radially inwardly from the interior surface 148C of the OCSV side wall 148 and defines an aperture 146A sized to receive the ICSV piston member 144B. The OCSV side wall 148 may also include a channel 150 disposed within the interior surface 148C of the OCSV side wall 148 proximate the cap end 148B of the OCSV side wall 148. The channel 150 is configured to receive one or more retainer rings 152.

The ICSV piston member 144B includes an ICSV side wall 154 and an ICSV base wall 156. The ICSV side wall 154 extends axially from the ICSV base wall 156 to an ICSV cap end 158, and includes an ICSV rim flange 160 that extends outwardly from the ICSV side wall 154. The ICSV base wall 156 includes a center post aperture 162 and may include one or more fluid flow apertures 164 that allow fluid to pass through the ICSV base wall 156. The ICSV side wall may also include one or more fluid flow apertures 164 that allow fluid to pass through the ICSV side wall 154.

Like the valve 36 embodiment shown in FIGS. 3-3B, the PRV spring 42 and the CSV spring 46 shown in FIGS. 7-7B are disposed in a series arrangement within the valve 36, utilizing the spring displacements and spring stiffnesses in the operation of the valve 36. This valve 36 embodiment may also include one or more spacers 128 to preload the PRV spring 42, or the CSV spring 46, or both.

In the embodiment shown in FIGS. 7-7B, the PRV spring 42 is disposed between a spacer 128 disposed within the ICSV piston member 144B and the cap 48, and the CSV spring 46 is disposed between a spacer 128 disposed within the PRV PH inner chamber 108 and the inner member support flange 146. As can be seen in FIGS. 7-7B, a portion of the CSV spring 46 extending between the spacer 128 and the inner member support flange 146 extends within an annular region 166 between the OCSV piston member 144A and the ICSV piston member 144B. The annular region 166 may facilitate maintaining the CSV spring 46 in the desired position; e.g., the annular region 166 prevents the CSV spring 46 from buckling.

The operational progression of the valve 36 embodiment shown in FIGS. 7-7B is similar to that described above and shown in FIGS. 5-5B and 6.

The present disclosure valve 36 is advantageously configured to facilitate adjusting the operation of the PRV valve function and/or the CSV valve function, for example to accommodate different applications, and/or to adjust the PRV valve function and/or the CSV valve function for the specific requirements of a particular application. For example, the force required to accomplish the PRV valve function and/or the CSV valve function may be varied by using PRV/CSV springs 42, 46 with different spring rates. In those embodiments that utilize a spacer 128 with a respective PRV/CSV spring 42, 46, the axial length of the spacer 128 (or collective axial length of a plurality of spacers 128) can also be used adjust the PRV valve function and/or the CSV valve function for the specific requirements of a particular application. In some applications, spacers 128 can be added or removed to tune the PRV valve function and/or the CSV valve function more finely. The adjustability of the PRV valve function and/or the CSV valve function may be accomplished using combinations of spacers 128 and spring rates. This adjustability is understood to provide a significant advantage.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft fluid control valve, comprising:
   a sleeve that extends axially between a base end and a cap end, the sleeve including a first inner chamber and a second inner chamber, and the sleeve is enclosed at the base end, and the first inner chamber is defined by a first sleeve wall and the second inner chamber is defined by a second sleeve wall, wherein the first inner chamber extends from the base end to the second inner chamber, and the second inner chamber extends from the cap end to the first inner chamber, and a fluid inlet port and a fluid outlet port are disposed in the first sleeve wall, and a high pressure reference port is in fluid communication with the base end and a low pressure reference port is in communication adjacent the cap end;
   a cap in communication with the cap end of the sleeve;
   a first piston having a center post, a base flange, and a piston head, wherein the center post extends axially between the base flange and a distal end, and the piston head is attached to the center post at an axial position between the base flange and the distal end, the piston head (PH) including a PH base flange and a PH side wall, the PH base flange extends outwardly from the center post and the PH side wall extends axially from the PH base flange to a PH side wall distal end;
   a second piston (SP) having a SP center flange and a SP side wall, wherein the SP side wall extends axially between a SP side wall base end and a SP side wall cap end;
   a first spring disposed between the SP center flange and the cap; and
   a second spring disposed between the PH base flange and the SP center flange.

2. The aircraft fluid control valve of claim 1, wherein the sleeve includes a base end wall disposed at the base end and the high pressure reference port is disposed in the base end wall.

3. The aircraft fluid control valve of claim 2, wherein a portion of the center post extends through the SP center flange and a retainer is attached to the center post adjacent the distal end of the center post.

4. The aircraft fluid control valve of claim 3, wherein the valve is configured to permit axial travel of the first piston within the first inner chamber, and to permit axial travel of the second piston within the first inner chamber and the second inner chamber.

5. The aircraft fluid control valve of claim 4, wherein the first spring and the second spring are configured such that axial travel of the first piston causes the second piston to contact the cap before the first piston axially contacts the second piston.

6. The aircraft fluid control valve of claim 5, wherein the fluid inlet port is disposed a first axial distance from the base end of the sleeve, and the fluid outlet port is disposed a second axial distance from the base end of the sleeve, and the second axial distance is greater than the first axial distance thereby axially separating the fluid inlet port from the fluid outlet port.

7. The aircraft fluid control valve of claim 6, wherein the valve is in an open configuration when the second piston is in contact with the cap.

8. The aircraft fluid control valve of claim 7, wherein in a valve fully open configuration, the first piston is in axial contact with the second piston and the piston head of the first piston is axially separated from the fluid outlet port.

9. The aircraft fluid control valve of claim 1, wherein the second piston includes a first cavity portion defined by the SP center flange and the SP side wall on a cap end side of the SP center flange, and a second cavity portion defined by the SP center flange and the SP side wall on a base end side of the SP center flange; and wherein a portion of the center post extends through the SP center flange thereby locating the distal end of the center post within the first cavity portion, and wherein a retainer is attached to the center post adjacent the distal end of the center post within the first cavity portion.

10. The aircraft fluid control valve of claim 9, wherein the PH side wall of the piston head is slidably received within the second cavity portion, and the second spring extends into the second cavity portion.

11. The aircraft fluid control valve of claim 1, wherein the sleeve and the second piston include respective mating physical features configured to positionally locate the second piston relative to the sleeve.

12. The aircraft fluid control valve of claim 11, wherein the second piston includes a rim flange disposed at the SP side wall cap end.

13. The aircraft fluid control valve of claim 12, wherein the second sleeve wall includes a pocket, and the rim flange includes a segment configured to be received within the pocket.

14. The aircraft fluid control valve of claim 12, wherein the low pressure reference port is disposed in the second sleeve wall, and the rim flange includes a channel aligned with the low pressure reference port.

15. The aircraft fluid control valve of claim 1, further comprising a spacer in contact with the first spring, or in contact with the second spring.

* * * * *